(12) United States Patent
Keyes

(10) Patent No.: US 8,727,423 B2
(45) Date of Patent: May 20, 2014

(54) SELF-DRAFTING DEVICE FOR SUB-SONIC TERRESTRIAL VEHICLES

(76) Inventor: Andrew J. Keyes, Athens, GA (US)

( * ) Notice: Subject to any disclaimer, the term of this patent is extended or adjusted under 35 U.S.C. 154(b) by 36 days.

(21) Appl. No.: 13/278,835

(22) Filed: Oct. 21, 2011

(65) Prior Publication Data

US 2013/0099525 A1 Apr. 25, 2013

(51) Int. Cl.
*B62D 35/00* (2006.01)

(52) U.S. Cl.
CPC ............. *B62D 35/00* (2013.01); *Y10S 180/903* (2013.01)
USPC ....................... 296/180.1; 296/180.5; 180/903

(58) Field of Classification Search
USPC ......... 296/180, 180.2, 180.3, 180.5; 180/903; 105/1.1
See application file for complete search history.

(56) References Cited

U.S. PATENT DOCUMENTS

| | | | |
|---|---|---|---|
| 3,419,897 A | | 12/1968 | Bratsberg |
| 3,713,607 A | | 1/1973 | Hill et al. |
| 4,095,835 A | * | 6/1978 | Ensor .......................... 296/180.3 |
| 4,116,482 A | | 9/1978 | Spiegel |
| 4,896,915 A | | 1/1990 | Morandi et al. |
| 5,101,927 A | | 4/1992 | Murtuza |
| 5,966,845 A | | 10/1999 | DiGiacomo |
| 7,111,898 B2 | | 9/2006 | Rinklin |
| 7,210,718 B1 | | 5/2007 | Budhu |
| 7,665,798 B2 | | 2/2010 | Hsia et al. |
| 7,780,223 B2 | | 8/2010 | Kottenstette et al. |
| 2008/0054677 A1 | | 3/2008 | McGee |

FOREIGN PATENT DOCUMENTS

| | | | |
|---|---|---|---|
| DE | 2836788 A | * | 3/1980 |
| FR | 2848521 | | 6/2004 |
| GB | 2465393 A | * | 5/2010 |

* cited by examiner

*Primary Examiner* — Glenn Dayoan
*Assistant Examiner* — Jason S Daniels
(74) *Attorney, Agent, or Firm* — Mitch Harris, Atty at law, LLC; Andrew M. Harris

(57) ABSTRACT

A self-drafting device for reducing the aerodynamic drag of sub-sonic vehicles includes an extension projecting forward from the vehicle in order to generate turbulence between a distal (forward) end of the extension and the vehicle itself, in order to reduce aerodynamic drag on the vehicle. The device may include a draft plate to increase the cross sectional area of the distal end and the draft plate may be tilted with respect to a vertical direction. The tilt, cross-sectional size and or extension of the device may be adjustable, and may be dynamically controlled by one or more motors during operation of the vehicle in conformity with a pressure profile across the vehicle that is measured using pressure sensors. The extension may be automatically retracted, e.g., a telescoping extension may be drawn under the hood of an automobile as the velocity of the vehicle decreases.

22 Claims, 4 Drawing Sheets

SELF-DRAFTING DEVICE FOR SUB-SONIC TERRESTRIAL VEHICLES

BACKGROUND OF THE INVENTION

1. Field of the Invention

The present invention relates generally to devices for improving the aerodynamic performance of sub-sonic terrestrial vehicles, and more particularly to a device that disrupts resistive air flow around a sub-sonic vehicle to reduce aerodynamic drag.

2. Description of the Related Art

Aerodynamic shaping of both airborne and land vehicles is a long-established design principle, both for handling performance and fuel efficiency. In general, particular curved shapes provide the best performance depending on other facets of a design, because they have lowered drag coefficients.

However, for practical reasons, and sometimes certain aesthetic reasons, the aerodynamic shaping of certain vehicles, e.g., sport utility vehicles (SUVs), truck tractors/trailers and the like, runs counter to the aerodynamic ideal, and the fuel efficiency of the vehicle is reduced due to increased aerodynamic drag.

Therefore, it would be desirable to provide a reduction in aerodynamic drag without requiring the design of the vehicle to naturally have a reduced drag coefficient.

SUMMARY OF THE INVENTION

The above objectives and others are achieved in a device and system and a method of operation of the device and system.

The device is an extension that projects forward in the usual direction of motion of the vehicle a sufficient length to cause turbulence in front of the vehicle that results in a reduction of overall drag forces on the vehicle. The extension may include a draft plate at its distal (forward) end, and the draft plate may be vertical or tilted, and may be shaped along the vertical axis and/or an axis parallel to the front of the vehicle. The length of the extension may be adjustable, and the extension may be formed from telescoping portions that can withdraw, at least partially, within the vehicle as the vehicle comes to rest. The length, draft plate size, and/or draft plate tilt may be motorized and controlled by a control system that measures differential pressure along a front profile of the vehicle and adjusts the length, draft plate size, and/or draft plate tilt to improve performance. The telescoping sections may include breakaway portions to reduce damage to objects contacted by the extension.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention encompasses devices and systems that improve the aerodynamic performance of vehicles, such as automobiles, trains, trucks and aircraft, in particular those vehicles having a drag coefficient that is substantially greater than an ideal drag coefficient, e.g., those vehicles having a substantially vertical initial profile normal to their direction of travel, such as sport utility vehicles (SUVs).

Figure 1A:
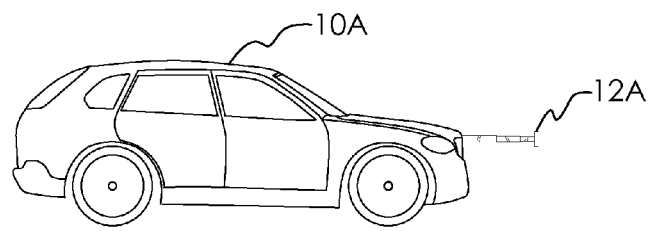
FIGS. 1A-1C are side views of vehicles including devices in accordance with various embodiments of the present invention.

Referring now to FIG. 1A, an automobile 10A is illustrated in accordance with an embodiment of the present invention. Automobile 10A is of a type that has a substantial drag coefficient, in part due to the substantially vertical slope of the front portion. A device 12A is provided to "self-draft" automobile 10A, i.e., to generate turbulence behind the tip (distal end) of device 12A so that the poorly shaped front of automobile 10A has a lesser impact on the aerodynamic drag of automobile 10A.

Figure 1B:
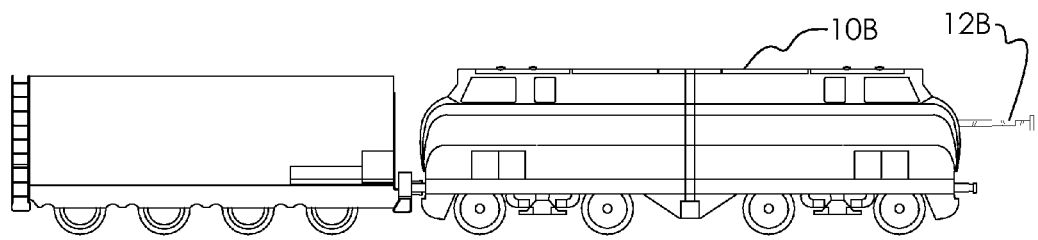

Referring now to FIG. 1B, a locomotive engine 10B is illustrated in accordance with an embodiment of the present invention. Locomotive engine 10B has a substantial drag coefficient for the same reasons as pointed out above with reference to FIG. 1A. A device 12B is provided to self-draft locomotive engine 10B, i.e., to generate turbulence behind the tip (distal end) of device 12B so that the shape of the front of locomotive engine 10B has a lesser impact on the aerodynamic drag of locomotive engine 10B.

Figure 1C:
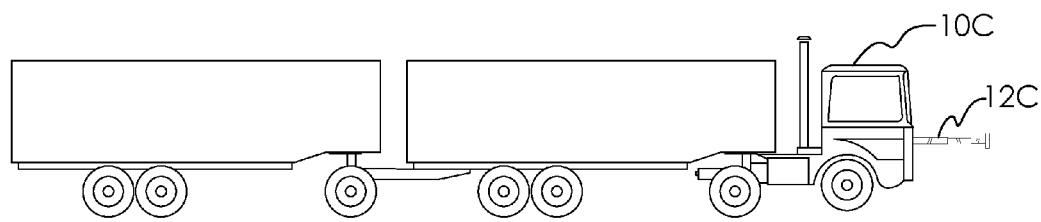

Referring now to FIG. 1C, a truck tractor 10C is illustrated in accordance with an embodiment of the present invention. Truck tractor 10C has a substantial drag coefficient for the same reasons as pointed out above with reference to FIGS. 1A and 1B. A device 12C is provided to self-draft truck tractor 10C, i.e., to generate turbulence behind the tip (distal end) of device 12C so that the shape of the front of truck tractor 10C has a lesser impact on the aerodynamic drag of truck tractor 10C.

The examples illustrated above with reference to FIGS. 1A-1C are not intended to limit the types of vehicles or purposes for the device of the present invention, other than to provide some example of vehicles for which the device of the present invention can provide a performance improvement by generating the turbulence described above. The present invention is also applicable to aircraft operating at sub-sonic speeds and for which the drag coefficient is substantial, e.g., transport aircraft having a front profile that forms a substantially vertical plane in front of the fuselage.

Figure 2:
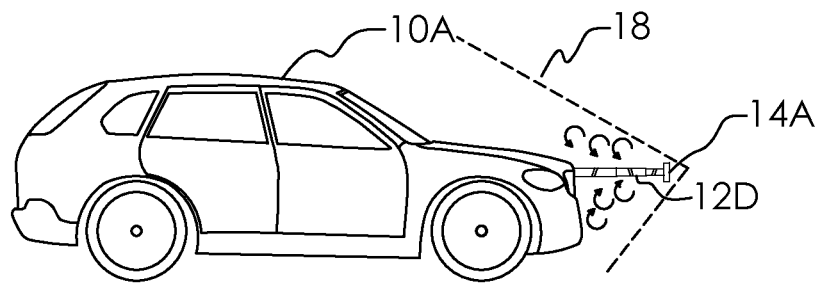
FIG. 2 is a side view of automobile 10A of FIG. 1, illustrating principles of operation of the invention.

Referring now to FIG. 2, automobile 12A is again illustrated with additional markings for illustrating a principle of operation of a device 12D affixed to a front of automobile 10A. Around the tip of device 12D, which, as illustrated includes a draft plate 14A, a cone 18 of turbulence is generated while automobile 12A is moving at normal operating speeds, e.g. velocities >45 m.p.h. The turbulence breaks-up the compression wave that would normally occur as the front of automobile 10A strikes the presumably still air in front of automobile 10A, reducing the force that the air generates on the front of automobile 10A. Since the effect of the above-described turbulence is generally beneficial when the vehicle itself does not already incorporate a shape that reduces the compressive force of the air, the device of the present invention is most applicable to vehicles having a box-shaped front profile, such as the SUVs mentioned above.

Table 1 below illustrates some example vehicles and their shapes, with a body area/length ratio factor computed to provide an indication of the shape of the example vehicle.

TABLE 1

| Type | Length | Width | Height | Units | Body Area/Length Ratio |
|---|---|---|---|---|---|
| Locomotive Engine | 850 | 120 | 180 | inches | 25.4 |
| Bus | 480 | 102 | 114 | inches | 24.2 |
| Van | 190 | 78 | 75 | inches | 30.8 |
| SUV | 175 | 75 | 70 | inches | 30 |
| Pickup | 210 | 80 | 75 | inches | 28.6 |
| Sedan | 190 | 72 | 57 | inches | 21.6 |
| Sports Car | 190 | 75 | 56 | inches | 22.1 |
| Passenger aircraft | 1831 | circular radius 66 | — | inches | 7.5 |
| Cargo aircraft | 1173 | circular radius 85.5 | — | inches | 19.6 |

In Table 1, approximate average measurements for the vehicle types have been used to compute a body area/length ratio by multiplying the width and height and dividing by the length. The body area/length ratio is a measure that can be used to give an indication of when an extension in accordance with the present invention can provide improvement, but there are other measures, such as a measure of the increase in cross-sectional area versus distance from the front of the vehicle that can alternatively provide such an indication. In general, it is assumed that the beneficial results afforded by the present invention are most effective for body area/length ratios greater than 20. Therefore, the exemplary SUV, van and pickup in Table 1 should show the most improvement in fuel efficiency, while the passenger aircraft would probably show little or no benefit from an additional self-drafting device.

Figure 3A:
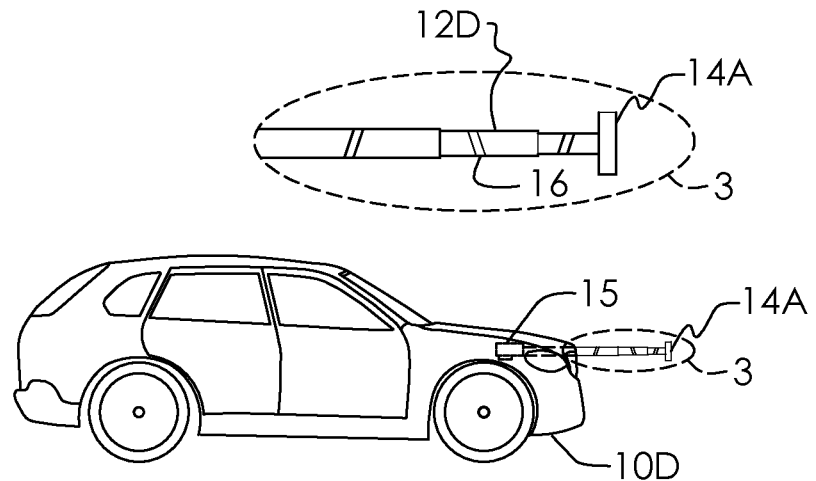
FIG. 3A is a side view.
Figure 3B:
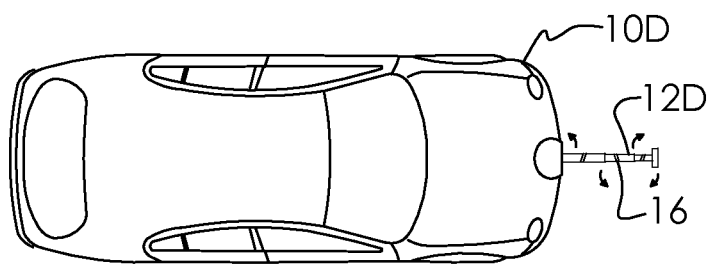
FIG. 3B is a top view, of an automobile including a device in accordance with another embodiment of the present invention.

Referring now to FIG. 3A and FIG. 3B, an automobile 10D having a self-drafting device 12D is shown in accordance with an embodiment of the invention. Device 12D is a telescoping device 12D having multiple portions as illustrated in callout 3, and can be refracted by a drive motor 15 located under the hood of automobile 10D to stow device 10D away at low speeds and when parked, to prevent damage to or by device 12D and to reduce the length of automobile 10D, as may be necessary when parking, turning, etc. Device 12D includes break-away sections 16, that may be made of a brittle ceramic, plastic or other material, so that if device 12D makes contact with another object with sufficient force, the portions of device 12D between breakaway sections 16 will have trajectories as shown by the arrows in FIG. 3B.

Figure 4:
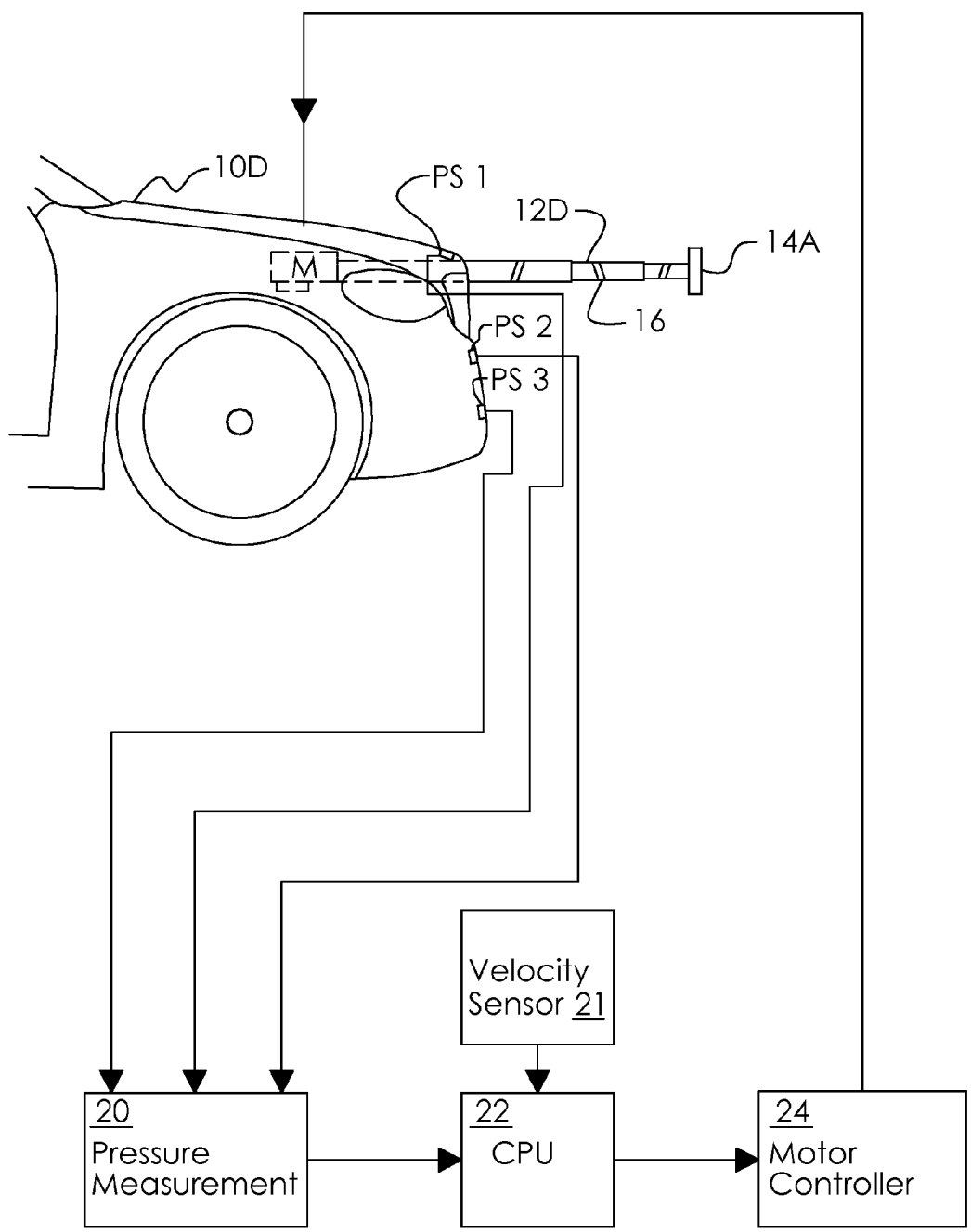
FIG. 4 is a pictorial diagram of a system in accordance with an embodiment of the present invention.

Referring now to FIG. 4, a system in accordance with an embodiment of the invention is shown installed in automobile 10D. Motor M and the rear end of the telescoping assembly of device 12D are located under the hood of automobile 10D above the engine. Multiple pressure sensors PS1, PS2 and PS3 are mounted along the front of automobile 10D and are displaced vertically to provide a pressure profile along the front of automobile 10D in a generally vertical direction. Pressure sensors PS1, PS2 and PS3 are coupled to a pressure measurement subsystem 20, which generally includes analog-to-digital converters (ADCs) to convert the outputs of pressure sensors PS1, PS2 and PS3 to values that can be operated on by a central processing unit (CPU) 22 that generally includes a microcontroller and memory storing program instructions executed by the processor to perform calculations and control as described below.

Differences between the air pressure measured by pressure sensors PS1, PS2 and PS3 allow estimation, by CPU 22, of the turbulence effect generated by device 12D and draft plate 14A, and the extension of device 12D, and optionally the tilt and size of draft plate 14A as described below, are adjusted by a motor controller 24 coupled to motor M, and optionally other motors as described below with reference to FIGS. 5B-5C. Velocity information can be provided by a velocity sensor 21, which may receive input from the velocity sensor(s) already present in automobile 12D, may be a standalone velocity sensor 21 or velocity may be computed from the air pressure measured by pressure sensors PS1, PS2 and PS3. The velocity information can be used to retract device 12D as automobile 10D slows down and extend device 12D as automobile 10D increases in speed.

Figure 5A:
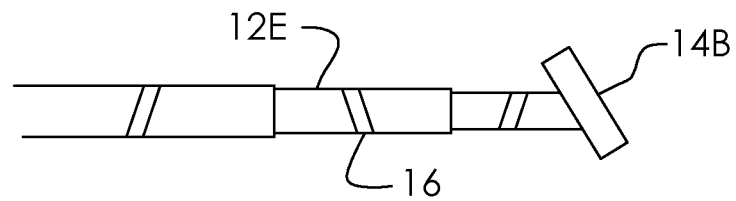
FIGS. 5A-5C are pictorial diagrams illustrating devices in accordance with various embodiments of the present invention.
Figure 5B:
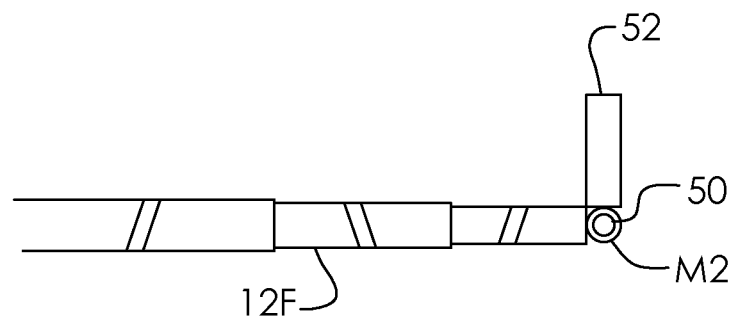
Figure 5C:
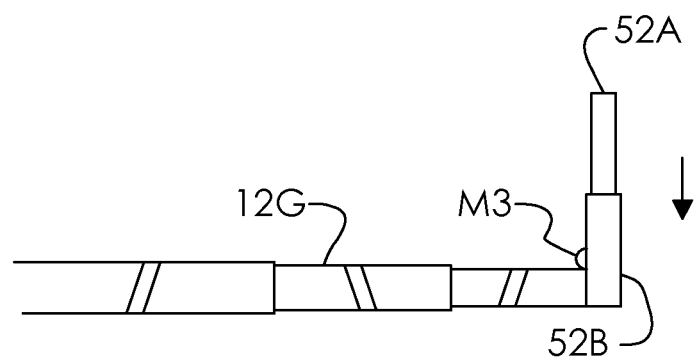

Referring now to FIGS. 5A-5C, various embodiments of the invention are shown having differing draft plate configurations, as may be used in the system depicted in FIG. 4. Device 12E of FIG. 5A illustrates a fixed, tilted draft plate 14B at the end of device 12E, so that device 12E is only adjusted in effective length by retracting or extending the telescoping assembly of device 12E. Device 12F of FIG. 5B includes a tiltable draft plate 52 that is rotatably coupled to the telescoping device 12F by a hinge 50 and rotated by motor M2 to change the angle of draft plate 52. Device 12F can also be adjusted in length by retracting or extending the telescoping assembly of device 12F. FIG. 5C illustrates a device 12G having a slideable extension 52A that is extended or retracted by a motor M3 to change the cross-sectional area of draft plate formed by fixed portion 52B and slidable extension 52A.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A device for reducing aerodynamic drag forces on a vehicle moving forward at a sub-sonic velocity, the device comprising:
 an extension projecting forward from the vehicle in a direction substantially parallel to a horizontal direction;
 a draft plate, having a substantially planar and contiguous front surface, the draft plate disposed at a distal end of the extension for generating turbulence in front of the vehicle, the draft plate having a cross-sectional area perpendicular to an ordinary direction of motion of the vehicle that is substantially less than a total cross-sectional area of the vehicle perpendicular to the ordinary direction of motion, wherein edges of the draft plate do not extend substantially backward to substantially close a volume between the draft plate and the front of the vehicle so that air within the volume between the draft plate and the front of the vehicle is substantially open to a circulation of air currents behind the draft plate and in front of the vehicle, wherein the extension projects forward from the vehicle to a length such that a distal end of the extension is sufficiently far forward to generate turbulence between the distal end of the extension and the front of the vehicle, wherein the turbulence reduces the aerodynamic drag forces on the vehicle; and
 a mount for mounting the extension to the vehicle.

2. The device of claim 1, wherein the extension is a telescoping extension comprising multiple sections, wherein when the velocity of the vehicle is reduced, the device is retracted toward the vehicle.

3. The device of claim 2, wherein the mount is mounted within the vehicle, and wherein the extension is retractable to a position within the vehicle when the velocity of the vehicle is reduced.

4. The device of claim 1, wherein the extension includes at least one breakable section having a low shear strength and extending through a cross-section of the extension at an angle substantially oriented away from normal to the central axis of the extension, such that an impact to the extension will cause the breakable section to fail at an impact energy substantially less than would be required for an extension absent the at least one breakable section.

5. The device of claim 1, wherein the draft plate is tilted away from normal to a central axis of the extension.

6. The device of claim 5, wherein an angle of tilt of the draft plate is adjustable.

7. The device of claim 1, wherein the cross-sectional area of the draft plate is adjustable.

8. A method of reducing aerodynamic drag forces on a vehicle, the method comprising:
moving the vehicle forward at a sub-sonic velocity; and
generating turbulence forward of the vehicle starting at a distal end of a device having an extension projecting forward from the vehicle in a direction substantially parallel to a horizontal direction, wherein the device includes a draft plate, having a substantially planar and contiguous front surface, the draft plate disposed at the distal end of the device and has a cross-sectional area perpendicular to an ordinary direction of motion of the vehicle that is substantially less than a total cross-sectional area of the vehicle perpendicular to the ordinary direction of motion, wherein edges of the draft plate do not extend substantially backward to substantially close a volume between the draft plate and the front of the vehicle so that air within the volume between the draft plate and the front of the vehicle is substantially open to a circulation of air currents behind the draft plate and in front of the vehicle, wherein the extension projects forward from the vehicle to a length such that the distal end of the extension is sufficiently far forward to generate turbulence between the distal end of the extension and the front of the vehicle, wherein the turbulence reduces the aerodynamic drag forces on the vehicle.

9. The method of claim 8, further comprising:
determining when the velocity of the vehicle is reduced; and
retracting the device toward the vehicle in response to determining that the velocity of the vehicle is reduced.

10. The method of claim 9, wherein the retracting retracts the extension to a position within the vehicle when the velocity of the vehicle is reduced.

11. The method of claim 8, further comprising preventing impact damage to an object struck by the extension by providing at least one breakable section of the extension having a low shear strength and extending through a cross-section of the extension at an angle substantially oriented away from normal to the central axis of the extension, such that an impact to the extension will cause the breakable section to fail at an impact energy substantially less than would be required for an extension absent the at least one breakable section.

12. The method of claim 8, wherein the draft plate is tilted away from normal to a central axis of the extension.

13. The method of claim 12, further comprising adjusting an angle of tilt of the draft plate.

14. The method according to claim 8, further comprising adjusting the cross-sectional area of the draft plate.

15. The method of claim 8, further comprising:
measuring air pressure across a profile of the vehicle, so that an effect of the extension on the aerodynamic drag forces can be estimated; and
adjusting an aerodynamic profile of the extension the extension in conformity with a pressure differential determined from a result of the measuring by activating at least one motor coupled to the extension.

16. The method of claim 15, wherein the at least one motor includes a motor for adjusting a length of the projection of the extension in the direction substantially parallel to the horizontal direction, and wherein the adjusting control the motor to adjust the length of the projection in conformity with the determined pressure differential.

17. The method of claim 15, wherein the adjusting adjusts a cross-sectional area of the draft plate to increase the generation of turbulence by the device, wherein the at least one motor comprises a motor coupled to the draft plate for adjusting the cross-sectional area in conformity with the determined pressure differential.

18. The method of claim 17, wherein the adjusting adjusts the adjustable draft plate by tilting an edge of the draft plate toward or away from the vehicle.

19. A system for reducing aerodynamic drag forces on a vehicle moving forward at a sub-sonic velocity, the system comprising:
a device mounted to the vehicle and including an extension projecting forward from the vehicle in a direction substantially parallel to a horizontal direction, wherein the device includes a draft plate, having a substantially planar and contiguous front surface for generating turbulence in front of the vehicle, wherein the draft plate has an area perpendicular to an ordinary direction of motion of the vehicle that is substantially less than a total cross-sectional area of the vehicle perpendicular to the ordinary direction of motion, wherein edges of the draft plate do not extend substantially backward to substantially close a volume between the draft plate and the front of the vehicle, whereby air within the volume between the draft plate and the front of the vehicle is substantially open to a circulation of air currents behind the draft plate and in front of the vehicle, wherein the extension extends in front of the vehicle to a length such that a distal end of the extension is sufficiently far forward to generate turbulence between the distal end of the extension and the front of the vehicle, wherein the turbulence reduces the aerodynamic drag forces on the vehicle, and wherein an aerodynamic profile of the extension is adjustable by at least one motor coupled to the extension;
multiple pressure sensors for measuring air pressure across a profile of the vehicle, so that an effect of the extension on the aerodynamic drag forces can be estimated; and
a controller coupled to the at least one motor and to the multiple pressure sensors for controlling the motor to adjust the aerodynamic profile of the extension in conformity with a pressure differential determined from the outputs of the multiple pressure sensors.

20. The system of claim 19, wherein the at least one motor includes a motor for adjusting the length of the projection of the extension in the direction substantially parallel to the horizontal direction, and wherein the controller controls the motor to adjust the length of the projection in conformity with the determined pressure differential.

21. The system of claim 19, wherein the draft plate is an adjustable draft plate having an adjustable cross-sectional area to increase the generation of turbulence, wherein the at least one motor comprises a motor coupled to the adjustable draft plate for adjusting the cross-sectional area in conformity with the determined pressure differential.

22. The system of claim 21, wherein the adjustable draft plate is adjustable by tilting an edge of the draft plate toward or away from the vehicle.

* * * * *